(12) United States Patent
Guerra

(10) Patent No.: US 9,643,784 B2
(45) Date of Patent: May 9, 2017

(54) ROLLER DRIVE SLEEVE

(71) Applicant: LEWCO, INC., Sandusky, OH (US)

(72) Inventor: Gerald T. Guerra, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 0 days.

(21) Appl. No.: 14/878,051

(22) Filed: Oct. 8, 2015

(65) Prior Publication Data

US 2016/0101943 A1 Apr. 14, 2016

Related U.S. Application Data

(60) Provisional application No. 62/061,732, filed on Oct. 9, 2014.

(51) Int. Cl.
  *B65G 13/06* (2006.01)
  *B65G 13/07* (2006.01)
(52) U.S. Cl.
  CPC .................................. *B65G 13/07* (2013.01)
(58) Field of Classification Search
  CPC ........ B65G 23/04; B65G 13/06; B65G 13/07; B65G 13/02
  USPC ........ 198/833, 834, 835, 781.1, 781.08, 790
  See application file for complete search history.

(56) References Cited

U.S. PATENT DOCUMENTS

| | | | | |
|---|---|---|---|---|
| 3,860,944 A * | 1/1975 | Huber | ..................... | G03D 3/02 118/423 |
| 4,096,942 A * | 6/1978 | Shepherd | ............. | B65G 47/261 198/781.06 |
| 4,681,215 A * | 7/1987 | Martin | ................... | B65G 39/09 193/37 |
| 5,336,319 A * | 8/1994 | Narang | ..................... | B05C 1/02 101/477 |
| 7,244,205 B2 * | 7/2007 | Kanaris | ................... | B65G 23/06 198/834 |
| 8,371,435 B2 * | 2/2013 | Agnoff | .................... | B65G 13/07 198/781.03 |
| 2015/0068873 A1 * | 3/2015 | Wallace | ................. | B65G 13/07 198/790 |
| 2015/0083554 A1 * | 3/2015 | Ragan | .................... | B65G 23/04 198/834 |
| 2015/0183583 A1 * | 7/2015 | Specht | ................... | B65G 39/12 198/790 |

* cited by examiner

*Primary Examiner* — James R Bidwell
(74) *Attorney, Agent, or Firm* — Fraser Clemens; Martin & Miller LLC; James D. Miller

(57) ABSTRACT

A sleeve for a conveyor roller includes a tubular wall configured to receive and press-fittingly engage with an outer surface of the conveyor roller. The sleeve includes a plurality of engagement members. The plurality of engagement members are formed on an outer surface of the tube and configured to engage with a torque transmitter.

4 Claims, 6 Drawing Sheets

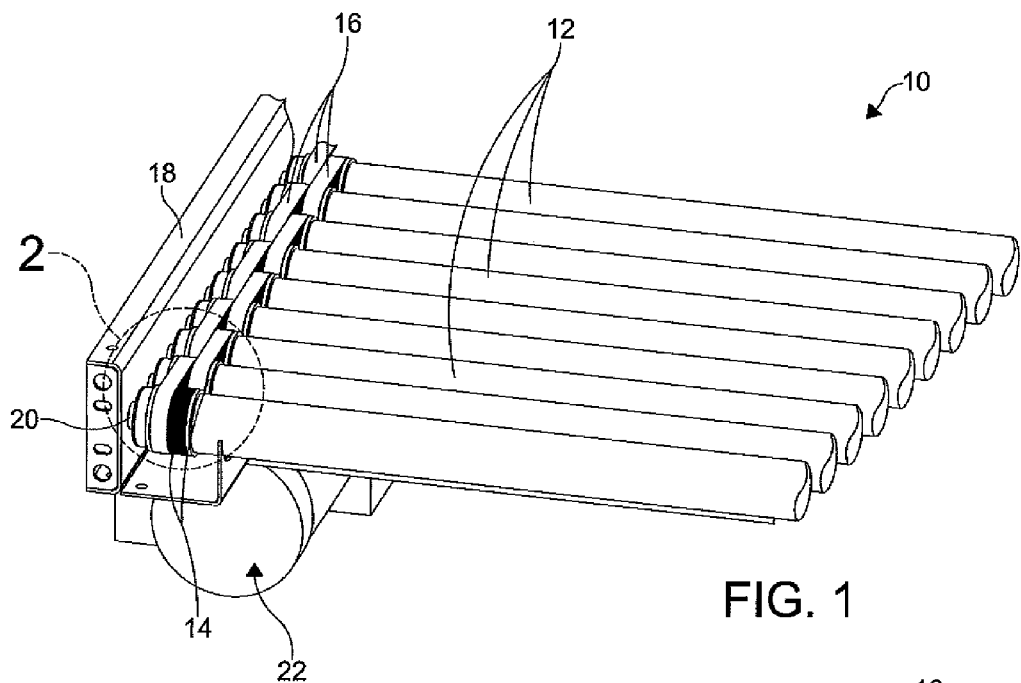
FIG. 1
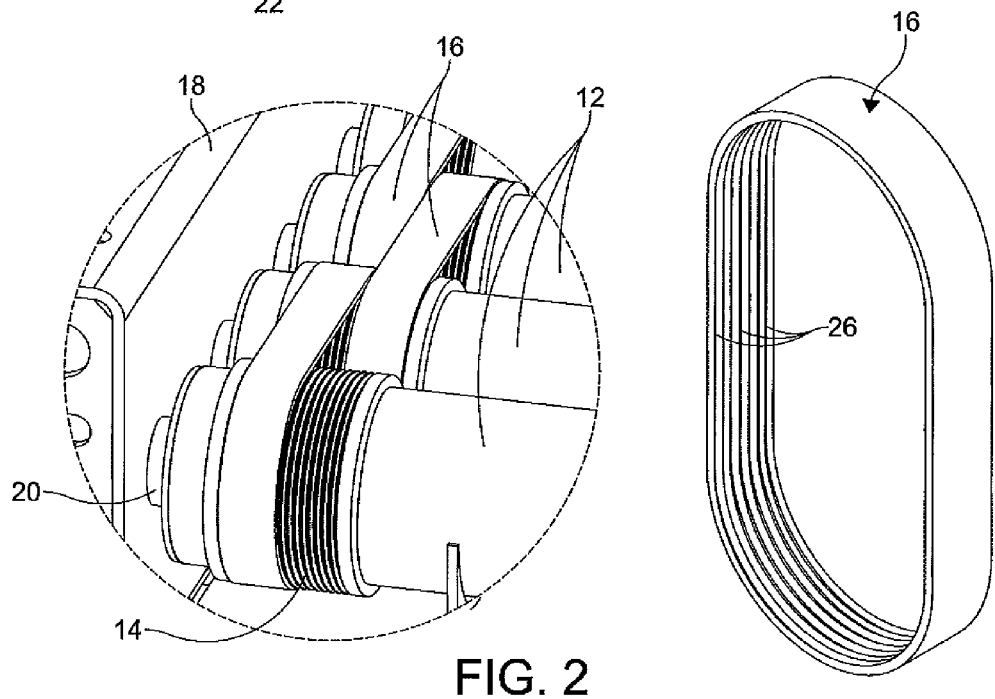
FIG. 2
FIG. 3

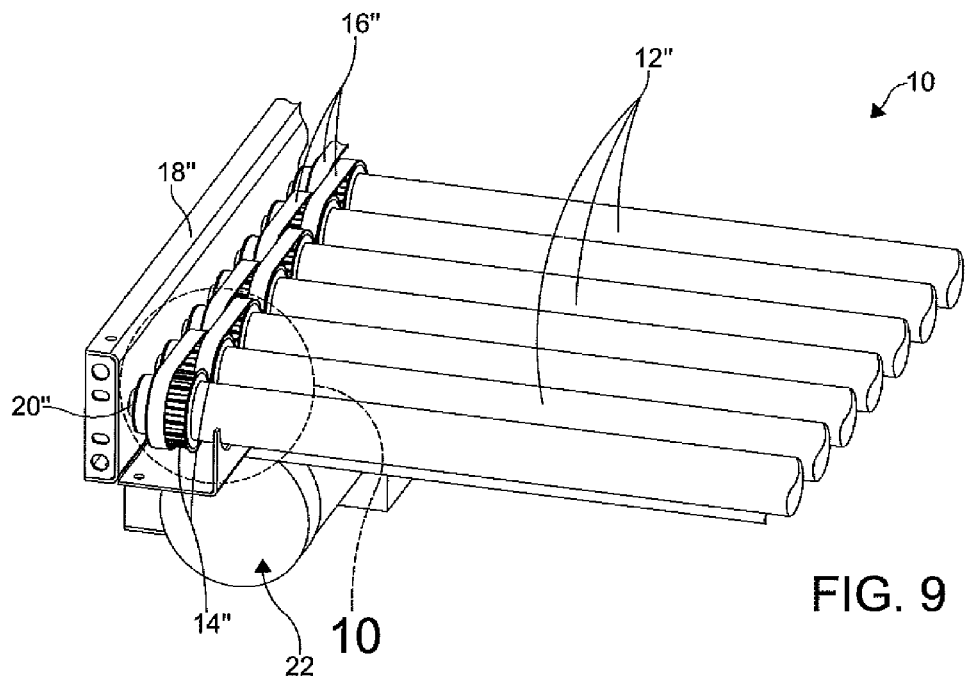
FIG. 9
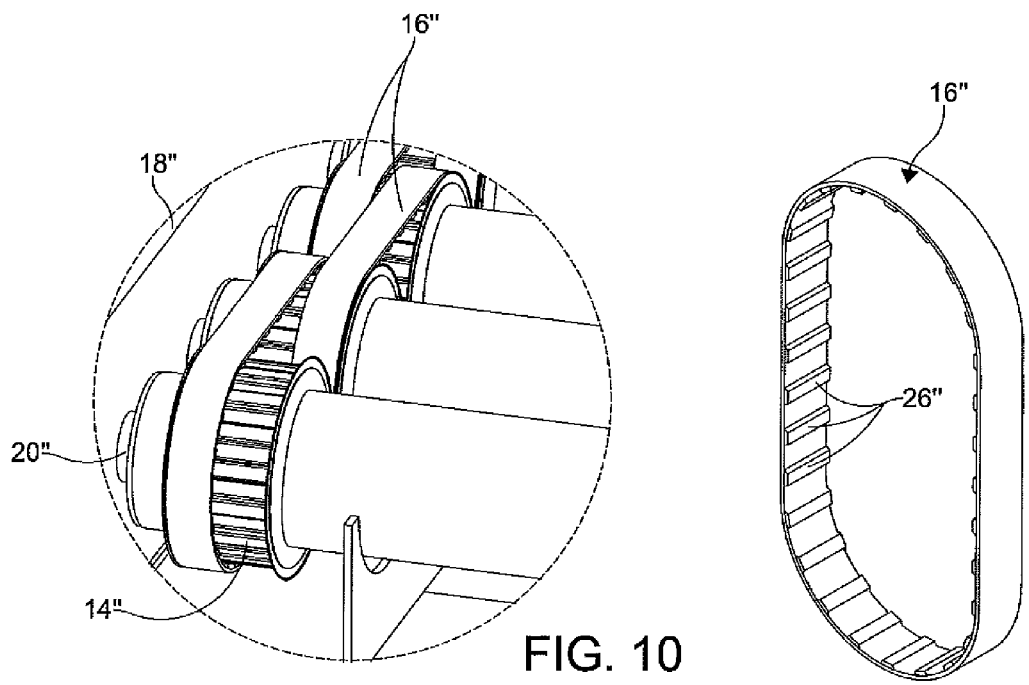
FIG. 10
FIG. 11

ROLLER DRIVE SLEEVE

CROSS-REFERENCE TO RELATED APPLICATIONS

This application claims the benefit of U.S. Provisional Application No. 62/061,732, filed on Oct. 9, 2014. The entire disclosure of the above application is hereby incorporated herein by reference.

FIELD OF INVENTION

The invention relates to conveyor rollers and more particularly to a sleeve for a conveyor roller for engagement with a torque transmitter that facilitates ease of assembly and minimizes manufacturing costs and complexity.

BACKGROUND

Roller conveyors are commonly employed for material handling to transport products or equipment from one location to another location. The roller conveyors typically consist of tubular rollers. For certain material handling applications, the rollers are driven by a torque transmitting mechanism such as a friction belt, multi-V belt, chain, timing belt or other various types of belts, for example. The torque transmitting mechanisms typically engage with a hub of the rollers. However, the rollers with hubs can be expensive and complex to manufacture.

In particular, many conveyor manufactures are now making POLY-V® brand multi-V conveyor belt driven roller conveyors because of the distinct advantages of high torque capability, low noise, and an ability to reduce the number of drives in many applications. Despite these advantages, many of the potential applications for POLY-V® brand conveyor belt driven roller conveyors become cost prohibitive because of the current processes used to manufacture the conveyor rollers.

The typical method used by conveyor and conveyor roller manufacturers technology is to use an expensive, machined, or injection molded hub with grooves on the outer diameter corresponding to the multi-V grooves formed on the POLY-V® brand conveyor belts. The hub includes an internal bearing, typically unique in its nature because the bearing is made to fit within the hub instead of a conveyor roller tube, thereby increasing overall cost. The hub is typically formed from or reinforced with expensive materials and pressed or pressed and welded into the roller tube, resulting in an expensive roller assembly.

Therefore, it would be desirable to provide a sleeve for a conveyor roller configured for use with torque transmitting devices that facilitates ease of assembly and minimizes manufacturing costs and complexity of the conveyor rollers.

SUMMARY OF THE INVENTION

In accordance and attuned with the present invention, a sleeve for a conveyor roller configured for use with torque transmitting devices that facilitates ease of assembly and minimizes manufacturing costs and complexity of the conveyor rollers has surprisingly been discovered.

According to an embodiment of the disclosure, a sleeve for a conveyor roller is disclosed. The sleeve includes a tube configured to receive and press-fittingly engage with an outer surface of the conveyor roller. The sleeve further includes a plurality of engagement members circumferentially formed on an outer surface of the tube and configured to engage with a torque transmitter.

According to another embodiment of the disclosure, a conveyor roller assembly is disclosed. The conveyor roller assembly including a conveyor roller having an outer surface. A sleeve receives and press-fittingly engages with the outer surface of the conveyor roller. The sleeve has a plurality of engagement members circumferentially formed on an outer surface thereof and configured to engage with a torque transmitter.

According to yet another embodiment of the disclosure, a method of assembling a conveyor roller assembly includes the steps of providing a conveyor roller including an outer tube and press-fittingly engaging a sleeve with the outer tube of the conveyor roller. The sleeve has a plurality of engagement members circumferentially formed on an outer surface thereof and configured to engage a torque transmitter.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings which:

FIG. 1 is a top fragmentary perspective view of a conveyor system according to an embodiment of the invention;

FIG. 2 is an enlarged fragmentary top perspective view of the conveyor system within circle 2 in FIG. 1;

FIG. 3 is a perspective view of a torque transmitter of FIGS. 1-2;

FIG. 9 is a fragmentary top perspective view of a conveyor system according to yet another embodiment of the invention;

FIG. 10 is an enlarged fragmentary top perspective view of a conveyor system within circle 10 in FIG. 9;

FIG. 11 is a perspective view of a torque transmitter of FIG. 9; and

DETAILED DESCRIPTION OF THE INVENTION

Figure 4:
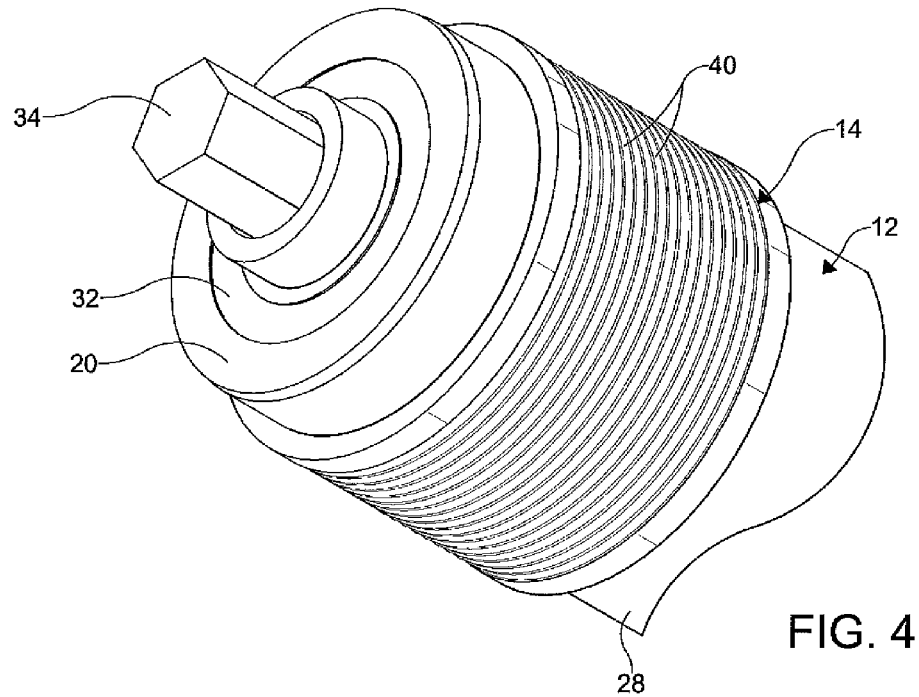
FIG. 4 is a fragmentary assembled top perspective view of the conveyor roller and the sleeve of FIGS. 1-2.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 illustrates a conveyor system 10 employing a plurality of tubular conveyor rollers 12 according to an embodiment of the present disclosure. The conveyor system 10 includes the rollers 12, a plurality of sleeves 14, and a plurality of torque transmitters 16. The rollers 12 are rotatingly mounted at preset intervals within a frame assembly 18, with a base end (not shown) of each of the rollers 12 mounted to a first side of the frame assembly 18 and a drive end 20 of each of the rollers 12 mounted to a second side of the frame assembly 18.

The conveyor system 10 can be any conveyor system used with rollers 12 configured to convey materials or goods. For example, as shown in FIG. 1, the conveyor system 10 is configured as a live roller conveyor wherein a drive assembly 22 is in mechanical communication with at least one of the rollers 12 to provide torque automatically to the rollers 12. The drive assembly 22 is configured as a conveyor drive assembly and can include a motor, a speed reducer (not shown), a drive pulley (not shown), sprockets (not shown), guards, and other components commonly employed with the conveyor drive assembly such as a drive shaft, for example. It is understood that while nine parallel rollers 12 forming a substantially straight conveyor system 10 is illustrated, any number of rollers 12 can be employed as desired. Additionally, the conveyor system 10 can include non-parallel rollers 12 to form curved portions of the conveyor system 10. The conveyor system 10 can be configured to cooperate with other conveyor beds and types depending on the application, if desired.

The torque transmitters 16 are either directly driven or indirectly slave driven by the drive assembly 22. The torque transmitters 16 engage with the sleeves 14 of the rollers 12 to transmit torque to the rollers 12. The torque transmitters 16 engage with the drive end 20 of the rollers 12. Each of the torque transmitters 16 can be any device used with roller conveyors now known or later developed. In the embodiment illustrated, each of the torque transmitters 16 is a multi-V conveyor belt such as a POLY-V® brand multi-V conveyor belt.

With reference to FIG. 2, the rollers 12 are configured for engagement with the torque transmitters 16 configured as multi-V conveyor belts. In the embodiment illustrated, the torque transmitters 16 engage a pair of the rollers 12 to transmit torque from a first one of the pair of rollers 12 to a second one of the pair of rollers 12. However, it is understood, the torque transmitters 16 can be employed to transmit torque directly from the drive assembly 22. As shown in FIG. 3, each of the torque transmitters 16 includes a plurality of V-shaped protuberances 26 formed on an inner surface thereof.

Figure 5:
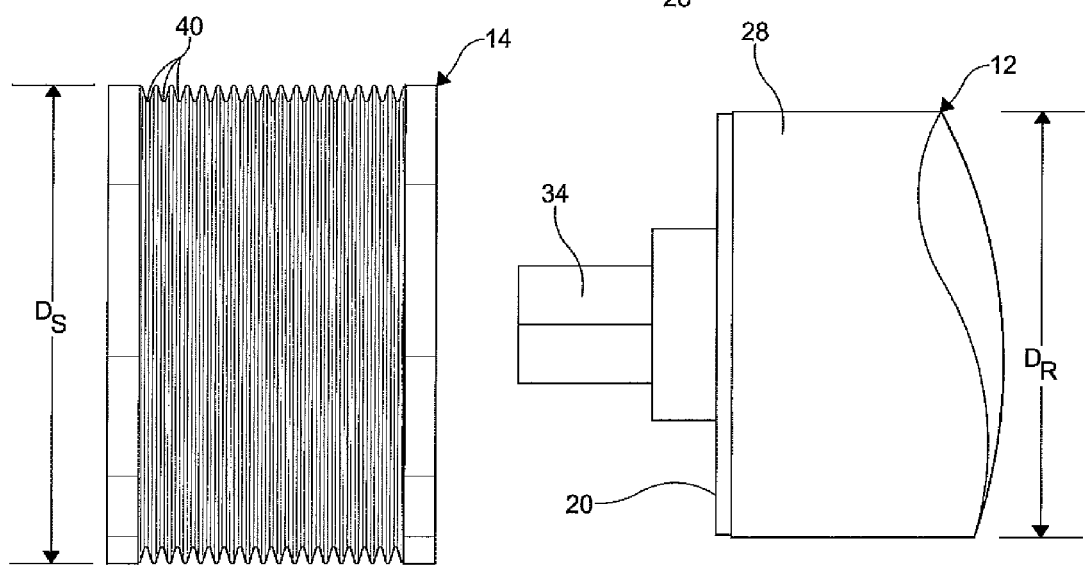
FIG. 5 is a fragmentary partially exploded front elevational view of the conveyor roller and the sleeve of FIG. 4.

With reference to FIGS. 2, 4, and 5, each of the rollers 12 can be any conveyor roller configured for use with roller conveyors. Each of the rollers 12 includes an outer tube 28 and one of the roller sleeves 14 received on an outer surface of the outer tube 28 at the drive end 20 of the roller 12. A bearing assembly 32 is disposed within the tube 28 at the drive end 20 of the roller 12 and a shaft 34 extends longitudinally through the outer tube 28 and the bearing assembly 32. The roller 12 has an outer diameter $D_R$ The outer diameter $D_R$ may be any diameter as desired. In non-limiting examples, the outer diameter $D_R$ of the rollers 12 is 2.5 inches, 1.90 inches, 1.375 inches, or another diameter commonly employed with roller conveyors.

The sleeve 14 has a tubular outer wall with an inner diameter $D_S$ The inner diameter $D_S$ of the sleeve 14 is less than the outer diameter $D_R$ of the roller 12 and is sized to permit the sleeve to be press fit on the roller 12. An interference is formed between the roller 12 and the sleeve 14 since the inner diameter $D_D$ of the sleeve 14 is slightly less than the outer diameter $D_r$ of the roller 12. A value of the interference is equal to a difference between the inner diameter $D_s$ of the sleeve 14 and the outer diameter $D_r$ of the roller 12. In certain embodiments, the value of the interference between the roller 12 and the sleeve 14 is an extreme interference value configured to resist the torque necessary to operate the conveyor system 10 while minimizing a deflection of the tube 28 to militate against degraded performance of the bearing assembly 32 and other internal components of the roller 12. The extreme interference value is defined as an interference value greater than the FN5 recommended maximum force fit standard established by the American National Standards Institute (A.N.S.I.) standard B 4.1. For example, according to the standard B 4.1, for the roller 12 having the outer diameter $D_r$ equal to 2.5 inches, the recommended maximum force fit between the roller 12 and the sleeve 14 would be 0.0062 inches. For the roller 12 having the outer diameter $D_r$ equal to 1.9 inches, the recommended maximum force fit between the roller 12 and the sleeve 14 would be 0.005 inches. However, due to fluctuating tolerances of the roller 12, the sleeve 14 may not remain on the roller 12 during operation when configuring the sleeve 14 and roller 12 for the interference value recommended by Therefore, in order to maintain the sleeve 14 on the roller 12 during operation, the value of the interference between the roller 12 having the outer diameter $D_r$ of 2.5 inches is an extreme interference value greater than 0.0062 inches and the extreme interference between the roller 12 having the outer diameter $D_r$ of 1.9 inches is an extreme interference value greater than 0.005 inches.

Advantageously, in a non-limiting example, for the roller 12 having the outer diameter $D_r$ equal to 2.5 inches, the value of the interference between the inner diameter $D_s$ of the sleeve 14 and the outer diameter $D_r$ of the roller 12 can be equal to an extreme interference value within the range of about 0.19 inches to about 0.036 inches. This range provides a safety factor for most roller conveyor applications to account for tolerances of the roller 12. The interference fit is configured to retain the sleeve 14 on the roller 12 during operation without application of additional machining of the roller 12 and/or sleeve 14. However, it is understood that varying ranges can be contemplated depending on the outer diameter $D_r$ of the roller 12 and varying tolerances thereof. It is understood an amount of interference can be reduced or an amount of retention can be increased by adding a chemical bonding product to increase an adherence between the sleeve 14 and the roller 12.

The sleeve 14 is formed from a material minimizing manufacturing costs and having sufficient flexibility, elasticity, and durability to facilitate achieving interference fits having extreme interference values. For example, the sleeve 14 can be formed from carbon steel, high density polyethylene (HDPE), polypropylene, or glass reinforced nylon. However, it is understood that materials with similar mechanical properties and/or characteristics including but not limited to aluminum, stainless steel, alloy steel, and other types of plastics, for example, can be employed if desired. The sleeve 14 has a thin wall thickness configured to easily expand for placing on the roller 12 during an assembly operation while maintaining durability. For example, favorable results have been obtained with the wall thickness in the range of about 0.080 inches to about 0.1225 inches. Although, the wall thickness can be greater than 0.1225 inches and less than 0.080 inches, if desired. The sleeve 14 can be formed from a molding process, an extrusion forming process, a roll forming process, or other process, as desired.

The sleeve 14 includes engagement members 40 formed on an outer surface thereof. The engagement members 40 are circumferentially formed on the outer surface of the sleeve 14. The engagement members 40 engage with the torque transmitter 16 while being either directly driven or indirectly slave driven by the drive assembly 22. The engagement members 40 are configured as a plurality of grooves concentric with respect to the sleeve 14. The grooves correspond in shape with a shape of the V-shaped protuberances 26 formed on the torque transmitter 16. Any number of grooves can be included such as 17 grooves or 9 grooves or any number of grooves corresponding to the number of V-shaped protuberances 26 formed on the multi-V conveyor belts engaging with the roller 12.

Figure 6:
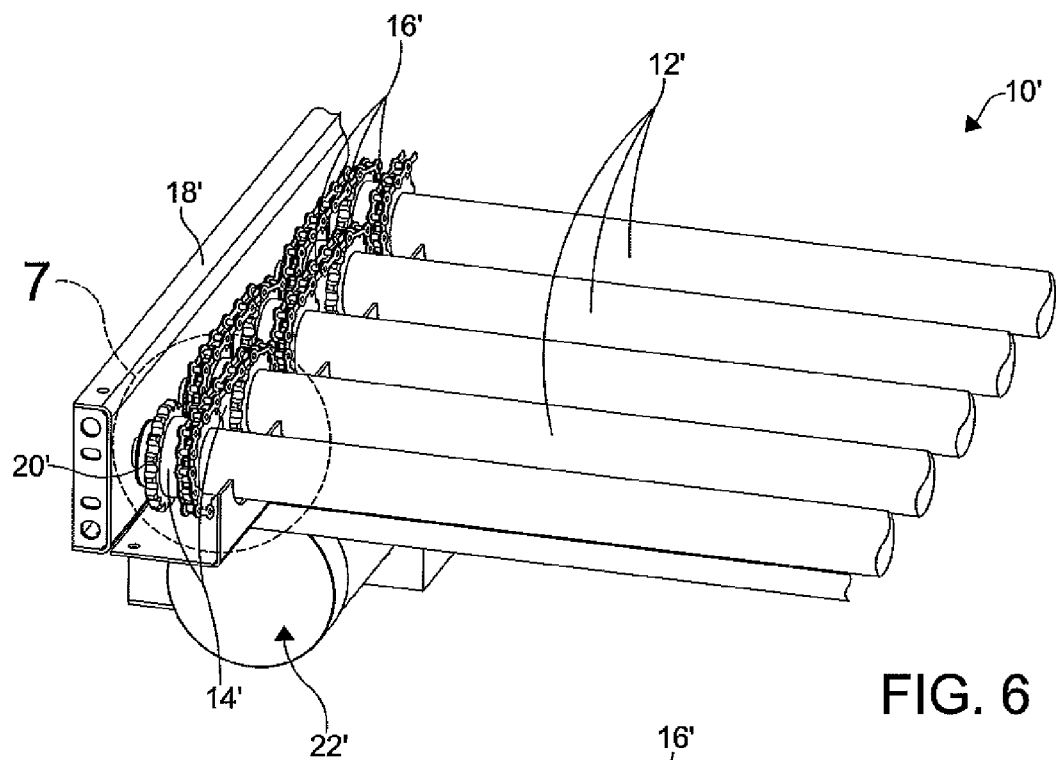
FIG. 6 is a fragmentary top perspective view of a conveyor system according to another embodiment of the invention.
Figure 7:
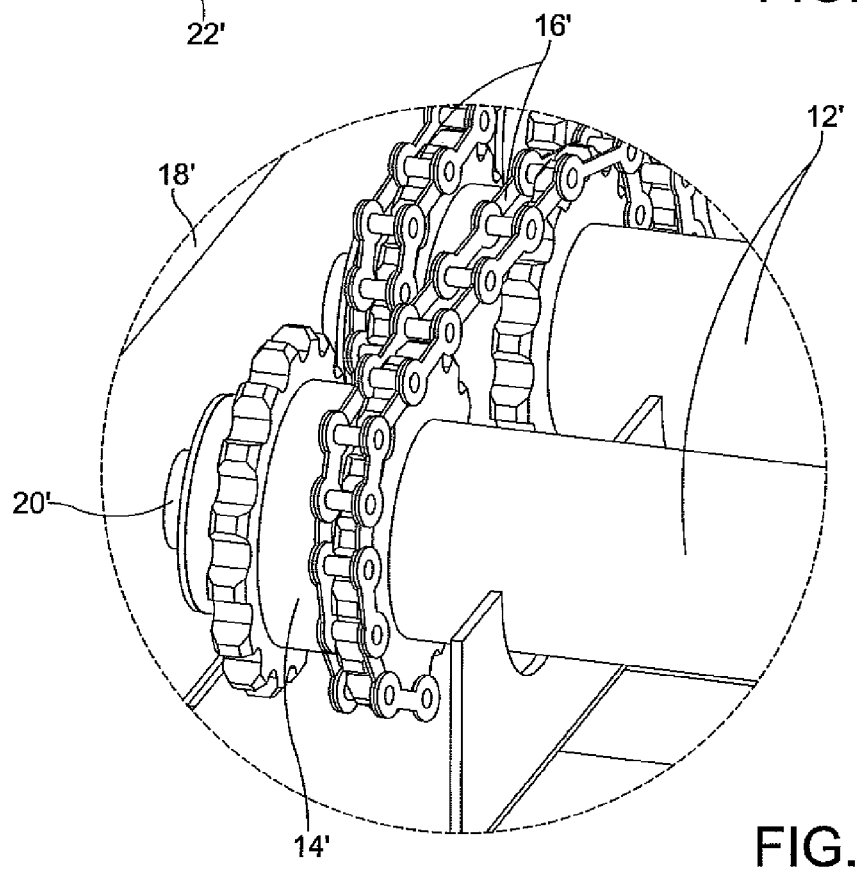
FIG. 7 is an enlarged fragmentary top perspective view of a conveyor system within circle 7 in FIG. 6.
Figure 8:
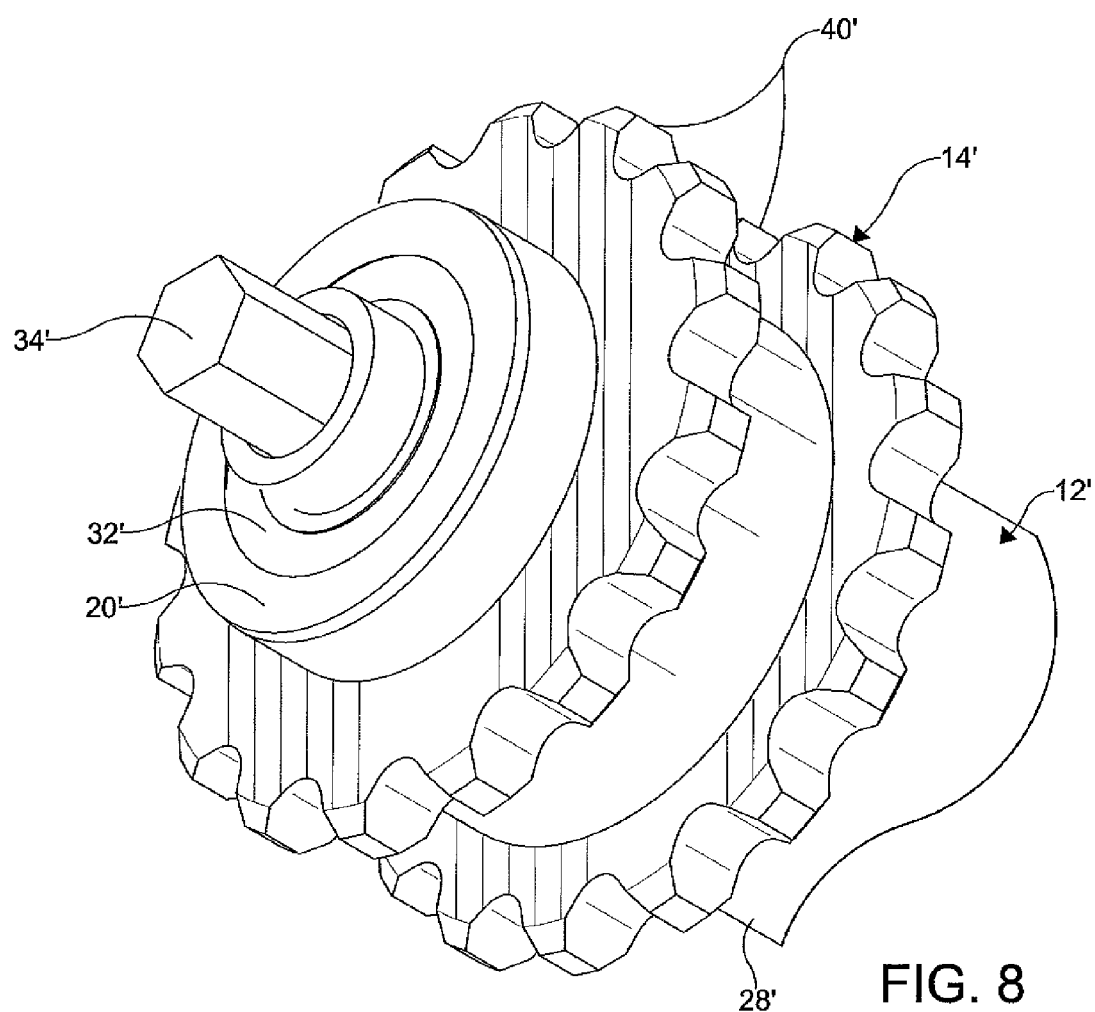
FIG. 8 is a fragmentary assembled top perspective view of the conveyor roller and the sleeve of FIGS. 6-7.

In another embodiment shown in FIGS. 6-8, the sleeve 14' is configured for use with torque transmitters 16' configured as roller conveyor chains. Features similar to the features illustrated in FIGS. 1-5 are denoted with the same reference numeral and a prime symbol for clarity. The sleeve 14' of FIGS. 6-8 is substantially similar to the sleeve 14 of FIGS. 1-2 and 4-5 except the engagement members 40' are configured as a pair of a plurality sprockets for engaging with the torque transmitters 16' configured as roller conveyor chains. Each of the pair of the plurality of sprockets engages with a torque transmitter 16'.

Figure 12:
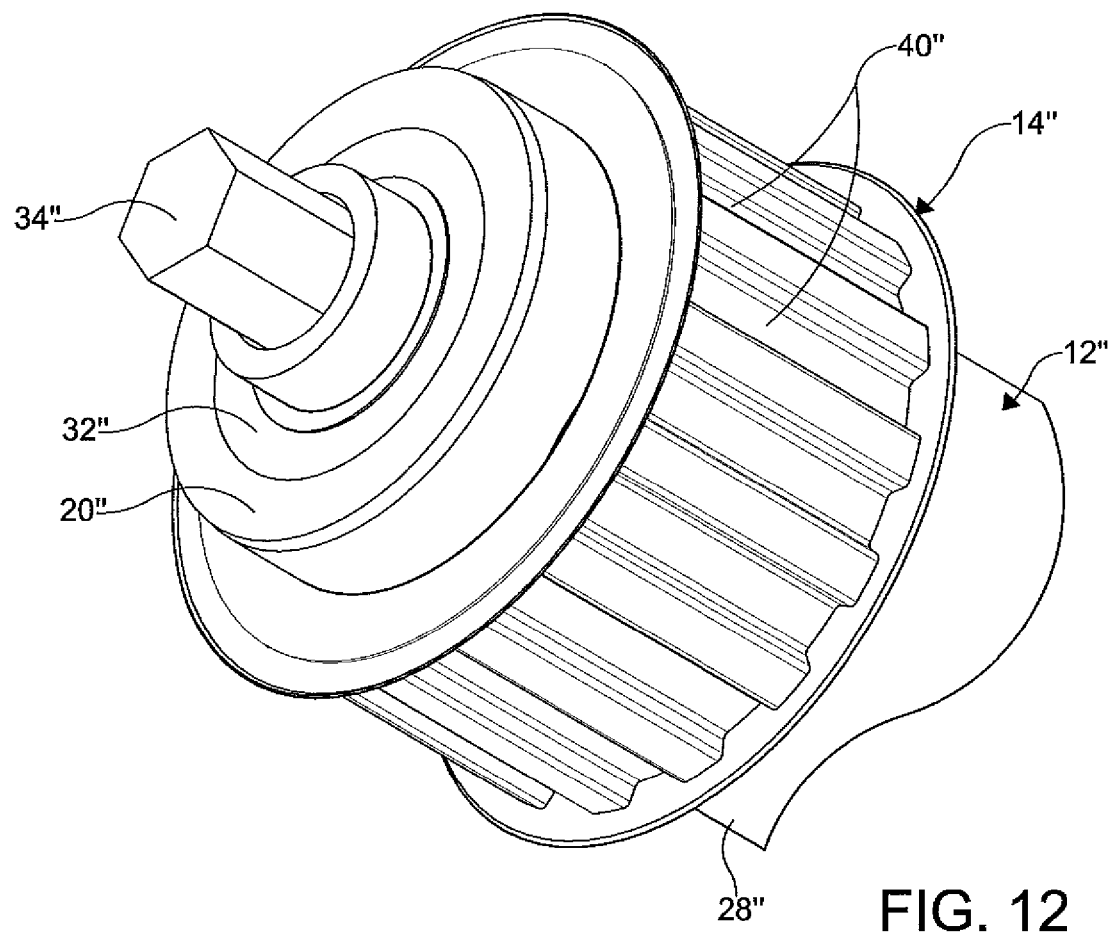
FIG. 12 is a fragmentary assembled top perspective view of a conveyor roller and a sleeve of FIG. 9.

In yet another embodiment shown in FIGS. 9-12, the sleeve 14" is configured for use with torque transmitters 16" configured as timing belts. As shown in FIG. 11, the timing belt 16" includes a plurality of parallel laterally extending protuberances 26". The sleeve 14" of FIGS. 9-10 and 12 is substantially similar to the sleeve 14 of FIGS. 1-2 and 4-5 except the engagement members 40" are a plurality of parallel laterally extending grooves engaging with the protuberances 26" of the torque transmitter 16".

To assemble the sleeve 14, 14', 14" to the roller 12, 12', 12", the sleeve 14, 14', 14" is press-fit to the roller 12, 12', 12" by a force fit operation so the inner surface of the sleeve 14, 14', 14" contacts the outer surface of the roller 12, 12', 12". The sleeve 14, 14', 14" is press-fit to the roller 12, 12', 12" forming an interference configured to maintain the sleeve 14, 14', 14" on the roller 12, 12', 12" during operation of the conveyor system 10, 10', 10". During assembly, a flexible cup member can be mounted inside the tube 28, 28', 28" of the roller 12 12', 12" for mounting of the bearing assembly 32, 32', 32". The flexible cup member allows for compression of the tube 28, 28', 28" during the force fit operation without affecting the bearing assembly 32, 32', 32". It is understood other processes can be employed, as desired, to secure the sleeve 14, 14', 14" to the roller 12, 12', 12".

Advantageously, the sleeve 14, 14', 14" is easily manufactured and easily assembled to each of the rollers 12, 12', 12". The sleeve 14, 14', 14" minimizes cost and complexity of installation of the conveyor system 10, 10', 10" and the rollers 12, 12', 12" while also facilitating a desired torque of the rollers 12, 12', 12". The sleeves 14, 14', 14" can be easily press-fit to the rollers 12, 12', 12" with minimal or no additional machining or welding.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A conveyor roller assembly comprising:
    a conveyor roller having an outer surface; and
    a sleeve received on and press-fittingly engaging the outer surface of the conveyor roller, the sleeve having a plurality of engagement members formed on an outer surface thereof and configured to engage a torque transmitter, wherein an interference fit is formed between the conveyor roller and the sleeve, wherein a value of the interference fit is equal to an extreme interference value, and wherein the extreme interference value is equal to about 0.036 inches to about 0.19 inches.

2. The conveyor roller assembly of claim 1, wherein the conveyor roller has a drive end, a base end, a tube extending from the drive end to the base end, a bearing assembly disposed within the tube at the drive end of the conveyor roller, and a shaft extending longitudinally through the tube and the bearing assembly, and wherein the sleeve engages the drive end of the conveyor.

3. The conveyor roller assembly of claim 1, wherein the engagement members are one of a plurality of grooves concentrically formed with respect to the sleeve, a pair of a plurality of sprockets, and a plurality of laterally extending parallel grooves.

4. The conveyor of claim 1, wherein the sleeve is formed from one of high density polyethylene, polypropylene, carbon steel, and glass reinforced nylon.

\* \* \* \* \*